Nov. 14, 1961  A. L. WILLIAMS  3,008,462
PROCESSING SAW FOR CUTTING AND PROCESSING ROCK OR STONE MATERIAL
Filed July 29, 1960  2 Sheets-Sheet 1

INVENTOR.
ALONZO L. WILLIAMS,
BY
McMorrow, Berman & Davidson
ATTORNEYS.

Nov. 14, 1961  A. L. WILLIAMS  3,008,462
PROCESSING SAW FOR CUTTING AND PROCESSING ROCK OR STONE MATERIAL
Filed July 29, 1960  2 Sheets-Sheet 2

INVENTOR.
ALONZO L. WILLIAMS,
BY
McMorrow, Berman & Davidson
ATTORNEYS.

United States Patent Office 3,008,462
Patented Nov. 14, 1961

3,008,462
PROCESSING SAW FOR CUTTING AND PROCESSING ROCK OR STONE MATERIAL
Alonzo L. Williams, Box 281, Hampton, Ill.
Filed July 29, 1960, Ser. No. 46,287
3 Claims. (Cl. 125—13)

This invention relates to devices for cutting and processing rock material, such as semi-precious stones, and more particularly to an apparatus for slabbing, trimming, grinding, polishing and sanding semi-precious stones and similar rock material.

A main object of the invention is to provide a novel and improved device for cutting and processing rock or stone material, the device being simple in construction, being easy to set up for use, and being arranged so that the working element thereof may be readily changed and a different working element may be substituted therefor.

A further object of the invention is to provide an improved saw device for cutting rock or other stone material, the device being inexpensive to fabricate, being durable in construction, being reliable in operation, and being very flexible so that any desired working member may be mounted thereon, for example, a saw blade, a grinding wheel, or other similar working element.

Further objects and advantages of the invention will become apparent from the following description and claims, and from the accompanying drawings, wherein:

FIGURE 5 is a perspective view of the device of the present invention shown with a grinding wheel substituted for the circular saw blade illustrated in FIGURES 1, 2 and 3.

Figures 1, 2:
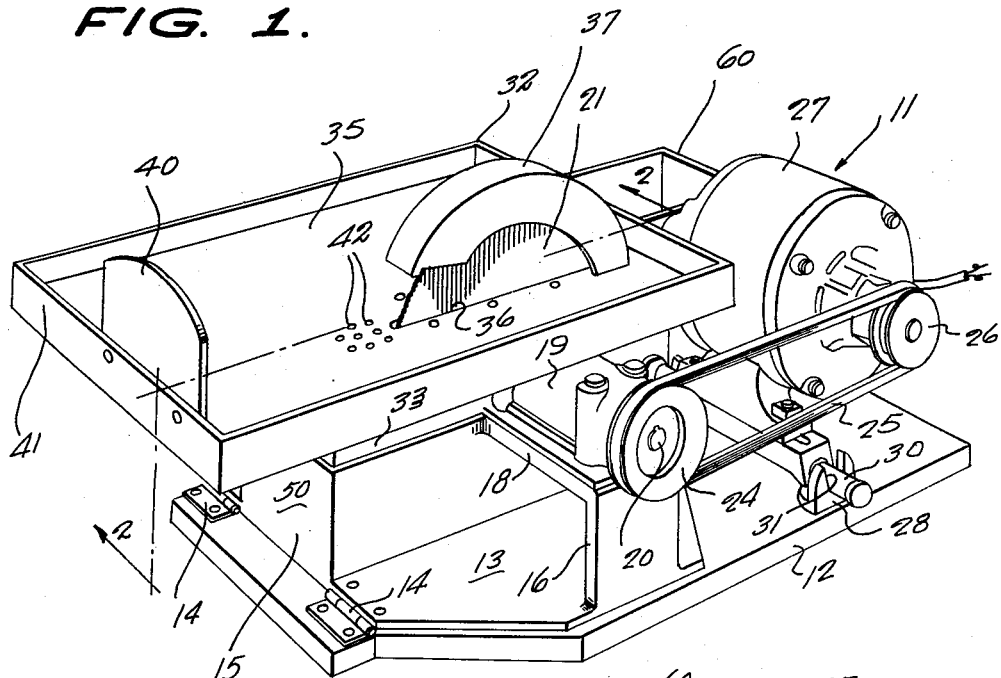
FIGURE 1 is a perspective view of an improved saw device constructed in accordance with the present invention.
FIGURE 2 is a vertical cross sectional view taken substantially on the line 2—2 of FIGURE 1.
Figure 2:
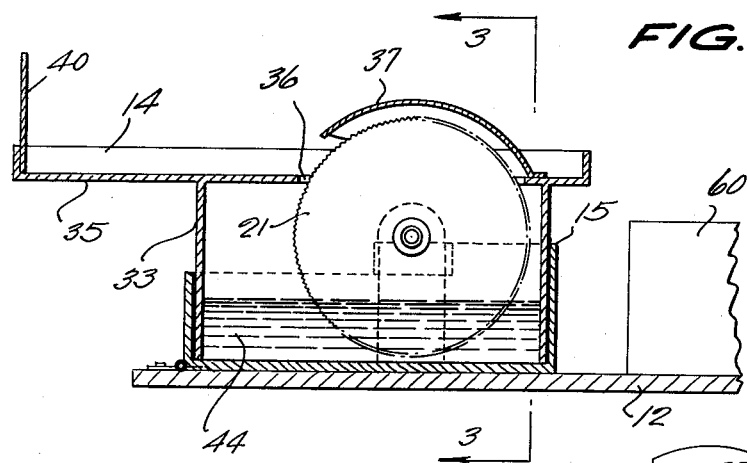
Figure 3:
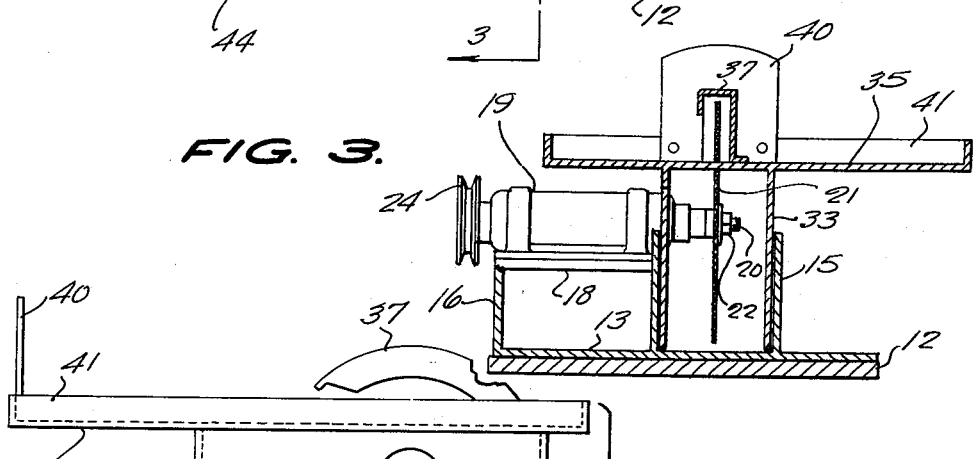
FIGURE 3 is a vertical cross sectional view taken substantially on the line 3—3 of FIGURE 2.

Referring to the drawings, and more particularly to FIGURES 1, 2 and 3, 11 generally designates a rock saw assembly constructed in accordance with the present invention. The assembly 11 comprises a horizontal base 12 to which is hinged a supporting plate 13, the supporting plate being hinged to the end marginal portion of the base 12 by a pair of transversely aligned hinge members 14, 14 which are secured to the supporting plate 13 at an end edge thereof, so that the supporting plate 13 is rotatable around the transverse horizontal axis defined by the aligned hinge elements 14, 14 and may be rotated upwardly in the manner illustrated in dotted view in FIGURE 4.

Integrally formed on the supporting plate 13 is a generally rectangular reservoir 15 having vertical upstanding walls, the reservoir being adapted to contain suitable coolant liquid. Also integrally formed with the supporting plate 13 is a vertically upstanding wall member 16 which is connected to the top marginal portion of the front wall 17 of the reservoir 15 by a horizontal plate element 18, whereby the members 16 and 18 define bracket means extending transversely over the front portion of the plate 13. Mounted on the plate member 18 is a transverse horizontally extending bearing member 19 in which is journaled the arbor shaft 20. Shaft 20 extends over the reservoir 15 and is adapted to support a circular rock saw blade 21 in a position wherein the lower portion of the blade is received in the reservoir and the upper portion of the blade is exposed for cutting action. Thus, the end of the shaft 20 is suitably shouldered and threaded and is adapted to receive a fastening nut 22 for securing the blade 21 to the shaft. Mounted on the front end of the arbor shaft 20 is a grooved pulley 24 which is drivingly coupled by a belt 25 to the driving shaft 26 of an electric motor 27 which is pivotally mounted on transversely aligned brackets 28, 28 provided on the base 12. Thus, the motor is secured on a supporting bracket 29 which is provided with oppositely extending shaft portions 30 which are pivotally engaged in notches 31 formed in the brackets 28, the arrangement being such that the weight of the motor 27 is employed to tension the belt 25 so as to drivingly couple the motor pulley 26 to the arbor shaft pulley 24.

Designated at 32 is a table member which is provided with a depending vertical supporting portion 33 which is of generally rectangular shape and which is dimensioned to slidably engage inside the generally rectangular reservoir 15. The supporting portion 33 is of sufficient height to support the horizontal top portion of the table, shown at 35, at a substantial height above the top rim of reservoir 15 and at a substantial height above the arbor shaft 20. The table portion 35 is formed with a longitudinally extending saw slot 36 located to receive the top portion of the saw blade 21, whereby said top portion protrudes above the horizontal portion 35 of the table in a position to engage an object to be cut when the object is moved against the edge of the blade.

An arcuately shaped guard member 37 is secured on the table element 35 above the saw blade 21, covering a substantial portion thereof, and only leaving exposed a portion sufficient to cut the object, for example, a semi-precious stone, or similar object. An upstanding vertical shield member 40 is provided on the vertical upstanding flange 41 of the table member 35 opposite the saw blade 21, whereby to protect the operator against particles of material released by the cutting action of the saw blade.

The table member 35 is provided with the upstanding peripheral flange 41 extending continuously therearound, as is clearly shown in FIGURE 1. Said table member is further provided with perforations 42 which allow dust and similar waste particles to drop downwardly into the coolant reservoir 15.

Figure 4:
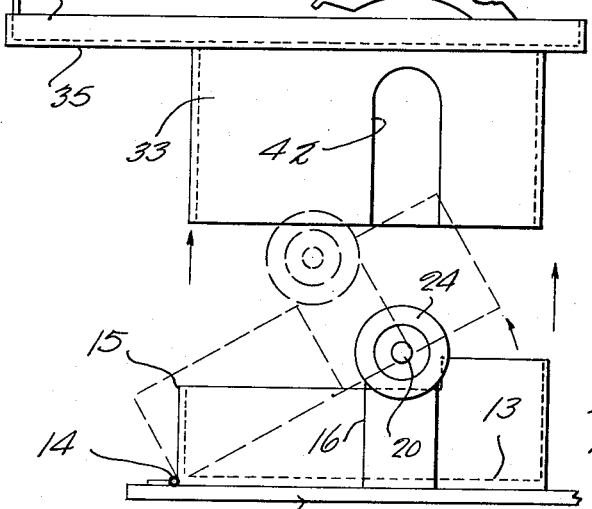
FIGURE 4 is an elevational view showing how the table member is telescopically engageable with the reservoir member of the saw device of FIGURES 1 to 3.

As shown in FIGURE 4, the front wall of the depending portion 33 of the table assembly 32 is formed with a vertical slot 43 of sufficient size to receive the bearing member 19 when the member 33 is telescopically engaged in the reservoir 15.

In operation, the reservoir 15 contains a quantity of suitable coolant liquid, the blade 21 having its lower portion immersed in the liquid, shown at 44 in FIGURE 2. The fragments of waste material are allowed to collect in the reservoir 15, dropping into the reservoir through the apertures 42, as above described.

When it is desired to convert the device for a different operation, for example, for a grinding operation, the table assembly 32 is removed by elevating same vertically, exposing the saw blade 21 so that the fastening nut 22 of shaft 20 may be released and so that the blade 21 may be detached from the shaft. A grinding wheel 45, or any other suitable processing member may then be secured on the shaft 20 in place of the saw blade, for example, in the manner illustrated in FIGURE 5. In conjunction with the grinding wheel or other working element, an arcuately shaped guard plate 46 is provided, said plate being detachably secured on the top edge of a transversely extending vertical wall portion 48 of the reservoir, which is located adjacent the grinding wheel, as shown in FIGURE 5. A work rest member 49 may be similarly detachably mounted on the top edge of the end wall 50 of the reservoir opposite the grinding wheel 45. Thus, the work rest member 49 comprises a horizontal surface adapted to support a stone or other object to be ground in a position so that its surface may be abraded by the grinding wheel 45. The work rest member 49 is further provided with an upstanding guard flange 51, corresponding to the guard member 40 provided on the table assembly 32, the flange 51 serving as a means to protect the operator against the injury from fragments released by the abrading action of the grinding wheel 45 on the workpiece.

As previously mentioned, the reservoir 15 may be rotated around the hinge axis defined by the hinges 14, 14, whereby the reservoir may be emptied, whenever required.

Obviously, any other suitable working member may be employed other than the saw blade 21 or the grinding wheel 45, for example, a sanding disc, a polishing wheel, or any other desired working member.

As shown in FIGURES 1 and 2, the base 12 may be provided with a suitable receptacle 60, located adjacent the reservoir 15 for storing the various auxiliary working members, such as the grinding wheel 45, the sanding disc, the polishing wheel, and the like when they are not in use.

While a specific embodiment of an improved saw apparatus for cutting and processing rock or stone material has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a saw for cutting and processing rock or stone material, a base, a coolant reservoir hinged to said base for rotation on a transverse horizontal axis and normally supported on said base, said reservoir having vertical walls, a transversely extending arbor shaft rotatably mounted on said reservoir, and a table member having a depending vertical supporting portion telescopically and slidably engaged in said reservoir, said supporting portion being of sufficient height to support the table member over the arbor shaft, said table member having a saw slot located over said shaft and in a plane perpendicular thereto.

2. In a saw for cutting and processing rock or stone material, a base, a support plate hinged at one transverse edge thereof to said base for rotation on a transverse horizontal axis, a coolant reservoir on said plate having vertical upstanding walls, bracket means on said plate extending laterally from said reservoir, a transversely extending arbor shaft rotatably mounted on said bracket means and extending over said reservoir, and a horizontal table member having a depending vertical supporting portion telescopically engaged in said reservoir and of sufficient height to support the table member over said arbor shaft, said table member having a saw slot located over said shaft in a plane perpendicular thereto.

3. In a saw for cutting and processing rock or stone material, a base, a support plate hinged at one transverse edge thereof to said base for rotation on a transverse horizontal axis, a generally rectangular coolant reservoir on said plate having vertical upstanding walls, bracket means on said plate extending laterally from said reservoir, a transversely extending arbor shaft rotatably mounted on said bracket means and extending over said reservoir, a horizontal table member having a depending vertical generally rectangular supporting portion telescopically engaged in said reservoir and of sufficient height to support the table member over said arbor shaft, said table member having a saw slot located over said shaft in a plane perpendicular thereto, and a circular saw blade secured on said arbor shaft and extending through said saw slot.

References Cited in the file of this patent

UNITED STATES PATENTS

| | | |
|---|---|---|
| 1,695,188 | Henkel | Dec. 11, 1928 |
| 2,279,979 | Gillich | Apr. 14, 1942 |
| 2,743,717 | Wilkin | May 1, 1956 |